United States Patent [19]

Browning

[11] Patent Number: 5,197,217
[45] Date of Patent: Mar. 30, 1993

[54] LINE TO LURE RIGGING SYSTEM
[75] Inventor: Charles W. Browning, Afton, Okla.
[73] Assignee: Duane S. Colby, Afton, Okla.
[21] Appl. No.: 823,359
[22] Filed: Jan. 21, 1992
[51] Int. Cl.⁵ ............................................ A01K 97/06
[52] U.S. Cl. ................................................ 43/4; 43/1
[58] Field of Search ................. 43/1, 4; 289/17, 18.1
[56] References Cited

U.S. PATENT DOCUMENTS

| | | |
|---|---|---|
| 99,572 | 2/1870 | Ingram . |
| 582,788 | 5/1897 | Huebener . |
| 895,493 | 3/1908 | O'Brien . |
| 1,259,664 | 3/1918 | Peters . |
| 2,284,564 | 7/1941 | Ebersole ................................ 43/52 |
| 2,310,030 | 2/1943 | Kruse .................................... 43/49 |
| 2,697,624 | 12/1954 | Thomas et al. ....................... 289/17 |
| 2,758,858 | 8/1956 | Smith, Sr. ............................... 43/1 |
| 2,847,220 | 8/1958 | Heffron et al. .................... 43/44.83 |
| 2,992,029 | 7/1961 | Russell ................................. 289/17 |
| 3,106,417 | 10/1963 | Clow .................................... 289/17 |
| 3,131,957 | 5/1964 | Musto ................................... 289/17 |
| 3,177,021 | 4/1965 | Benham ................................ 289/17 |
| 3,500,576 | 3/1970 | Ostrom .............................. 43/42.49 |
| 3,521,918 | 7/1970 | Hammond ............................ 289/17 |
| 3,630,555 | 12/1971 | Newlin ................................. 289/17 |
| 3,752,516 | 8/1973 | Mumma ............................... 289/17 |
| 3,837,691 | 9/1974 | Smythe ................................. 289/17 |
| 3,855,723 | 12/1974 | McGahee ........................... 43/44.83 |
| 3,869,821 | 3/1975 | McGahee ........................... 43/42.49 |
| 3,873,140 | 3/1975 | Bloch ................................... 289/17 |
| 3,936,971 | 2/1976 | McGahee ........................... 43/44.83 |
| 4,029,346 | 6/1977 | Browning ............................. 81/419 |
| 4,101,152 | 7/1978 | Gardipee ............................. 289/17 |
| 4,403,797 | 9/1983 | Ragland, Jr. ......................... 289/17 |
| 4,406,081 | 9/1983 | Garner .............................. 43/43.11 |
| 4,535,562 | 8/1985 | Fry .................................. 43/43.16 |
| 4,864,762 | 9/1989 | Cox ......................................... 43/4 |
| 4,873,784 | 10/1989 | Petron .............................. 43/44.95 |
| 4,905,403 | 3/1990 | Manno .............................. 43/43.16 |

Primary Examiner—Richard K. Seidel
Assistant Examiner—Chuck Y. Mah
Attorney, Agent, or Firm—Head & Johnson

[57] ABSTRACT

A rigging system to attach a fishing line to a lure or hook. A knot tier is provided wherein a loop of the fishing line may be wrapped twice around the body of the knot tier to form two circles, wherein an end of the loop may be retained in the knot tier, and wherein the two circular wrappings may be pulled over the retained end to form a knotted loop. A lure connector allows connection of the knotted loop to the lure or hook without tying the knotted loop to the lure connector.

8 Claims, 4 Drawing Sheets

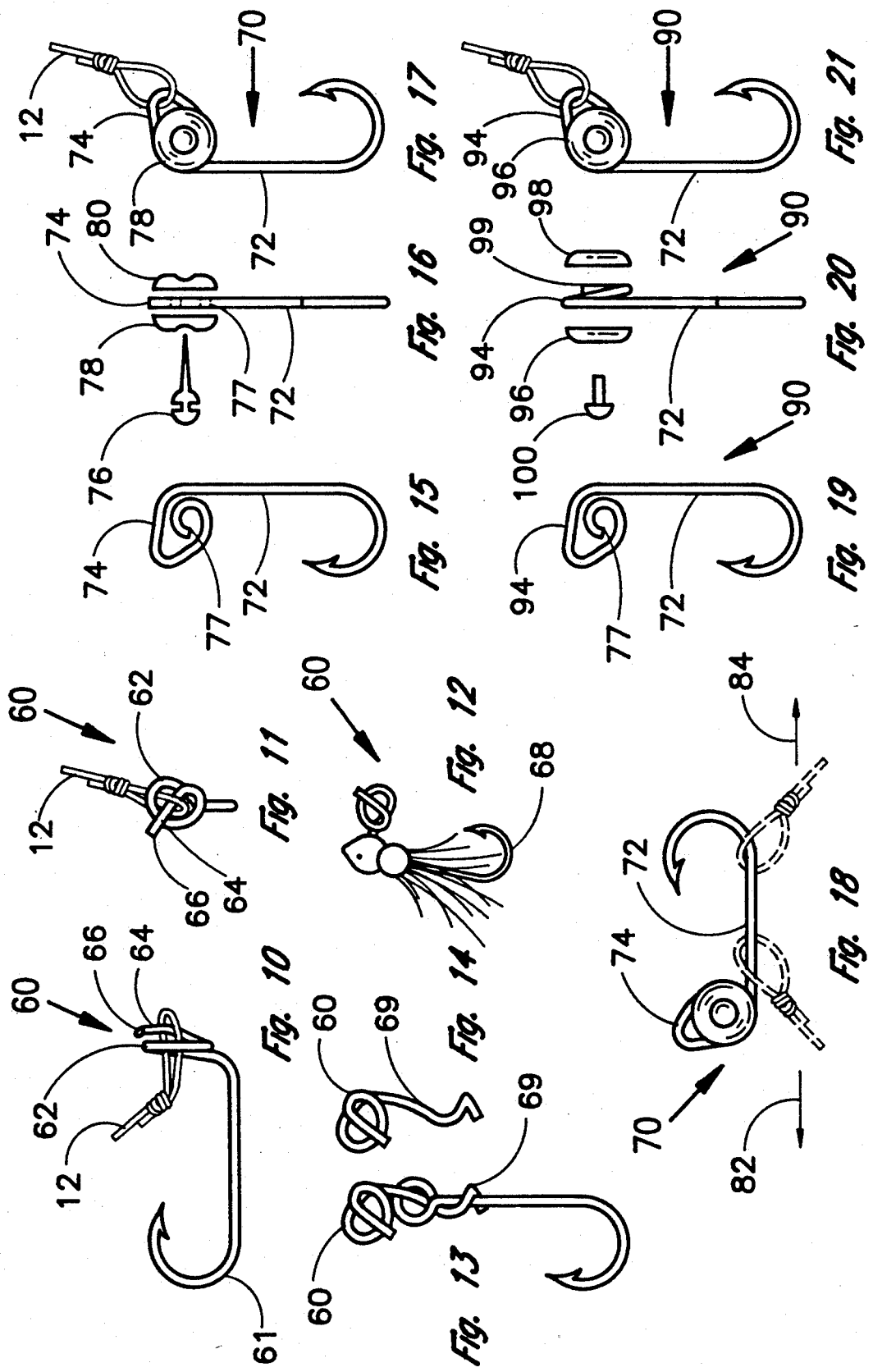

LINE TO LURE RIGGING SYSTEM

FIELD OF THE INVENTION

The present invention relates to a rigging system to quickly and easily attach and detach a fishing line to a lure or hook.

BACKGROUND OF THE INVENTION

The use of synthetic fishing line such as monofilament line renders the attachment of the line to the hook or lure difficult. The line is often clear and difficult to see and, while it may be looped or bent to a desired position, it will not stay positioned since it is somewhat resilient. The synthetic line also has a smooth exterior.

In many cases, it is desirable to produce a loop knot in the line or at the end of the line that will not slip, unwind or cut itself under pressure.

Additionally, it is often desirable to produce a knotted loop wherein the loop is fairly small.

No hand held device has been offered in the past to tie a loop knot. Up to now, all loop knots have been tied strictly by hand whether empty loops or loops containing a lure, all are hand tied. Likewise, various connection devices have been offered to connect a line to a hook or lure.

Most fisherman today use a slidable-type knot that tightens down securely against the eyelet of the lure or hook as follows:

Clow (U.S. Pat. No. 3,106,417) discloses a hand held knot tying device for tying a slidable knot which differs from the knot produced by the present invention. Clow shows a hook attached.

Smythe (U.S. Pat. No. 3,837,691) discloses a hand held knot tying apparatus which ties a slidable knot with a hook attached dissimilar to the present invention.

Musto (U.S. Pat. No. 3,131,957) discloses a hand held knot tying device which ties a slidable knot and which results in a different knot produced by the present invention with a hook attached.

Benham (U.S. Pat. No. 3,177,021) discloses a tubular knot tying device which ties a slidable knot and produces a different knot than the present invention with a hook attached.

Gardipee (U.S. Pat. No. 4,101,152) discloses a hand held knot tying device capable of tying a slidable loop with a lure attached although a different type of knot results.

Ragland, Jr. (U.S. Pat. No. 4,403,797) and Cox (U.S. Pat. No. 4,864,762) each disclose hand held knot tying devices to a tie a slidable loop having different knots than the present invention. All these devices are for tying slidable knots that tighten down tightly against the eyelet of the lure.

Ingram (U.S. Pat. No. 99,572) and Ebersole (U.S. Pat. No. 2,284,564) illustrate sinkers and bobbers having an eyelet with an extending pin. Both depend on clamping and wrapping friction for holding sinkers or bobbers in a chosen location on a line. They are not intended for, nor could they be used successfully, on fish hooks and lures in their present form.

Kruse (U.S. Pat. No. 2,310,030) discloses a bobber utilizing rubber disks to hold fishing line in place.

Heffron et al. (U.S. Pat. No. 2,847,220) discloses a hook having a spiral extension on the shank.

McGahee (U.S. Pat. No. 3,855,723) discloses a connector mechanism wherein a central shaft extends through an oval eye for a substantial distance.

Garner (U.S. Pat. No. 4,406,081) discloses a fishing bobber having a resilient bone-shaped attachment to hold a fishing line in place.

Petron (U.S. Pat. No. 4,873,784) discloses semi-spherical head portions connected by a shank holding a line in place.

Nothing in the prior art has disclosed a knot tying device wherein a doubled over line is utilized to produce a non-slip knotted loop. Moreover, nothing in the prior art has suggested an integrated system utilizing a knot tying device to produce a knotted loop which may be utilized with a connection mechanism on a hook or lure wherein the loop may be detachably connected to the connection mechanism.

Accordingly, it is a principal object and purpose of the present invention to provide a line to lure rigging system wherein a knot tying device produces a knotted loop for attachment to a connection mechanism on a lure or hook.

SUMMARY OF THE INVENTION

A line-to-lure rigging system is provided in the present invention. In one embodiment of the invention, a fixed loop knot tying device has an elongated body having a pair of identical ends. Near each end is a recess which includes a notch. The recesses are each closed by a jaw extending from the body.

The knot tying device is used to produce a fixed loop knot easily and quickly. Initially, a length of line is doubled over so that a loop is formed at the end thereof. The knot tying device may be held in the left hand between the left thumb and forefinger with the length of folded line under the thumb. An adequate length of folded line will extend from the thumb. The loop end will then be retained by the forefinger of the opposite hand. With the folded line held against the device, the line is wrapped around the knot tying device to form two circles. After the two circles have been wound around the body, the end of the line will be brought across the circles and will be hooked into the recess on that side by moving past the jaw.

The knot tying device will then be pulled away from the circular lines so that the looped end passes through the two circles while the end of the line is retained by the notch.

Once a knotted loop has been formed, the fishing line may be connected to a lure, jig or hook by use of a connection mechanism.

In one embodiment of the connection mechanism, an eyelet has a generally circular configuration. The eyelet connection also includes an extending post that crosses the diameter of the eyelet generally parallel to the plane of the eyelet. The post extends past the circumference of the eyelet with the terminal tip of the post bent toward the eyelet. A space is thus provided between the end of the terminal tip and the eyelet for passage of the loop. It is important to maintain line passage space between the post and the eyelet where the post crosses over the circumference of the eyelet.

In order to attach the knotted loop to the eyelet connection, the loop is inserted through the eyelet from the side opposite the post. The loop will then be manually opened and threaded over the post. Once the loop is over the post, it will not be able to come off until forcibly pushed back over the terminal end of the post.

BRIEF DESCRIPTION OF THE DRAWINGS

FIGS. 10 and 11 illustrate a quick change eyelet connection for a lure, jig or hook for attachable connection to the knotted loop in the line-to-lure rigging system of the present invention.

FIG. 12 illustrates a quick change eyelet connection on a jig;

FIGS. 13 and 14 illustrate an adaptable quick change eyelet connection which may be fastened to an existing hook;

FIGS. 15, 16 and 17 illustrate the assembly of a split head jig connection for detachable connection of a knotted loop;

FIG. 18 shows an assembled split head connection illustrating attachment and detachment of a knotted loop;

FIGS. 19, 20 and 21 illustrate an alternate split head connection for attachment of a knotted loop.

DETAILED DESCRIPTION OF THE PREFERRED EMBODIMENT

Figure 1:
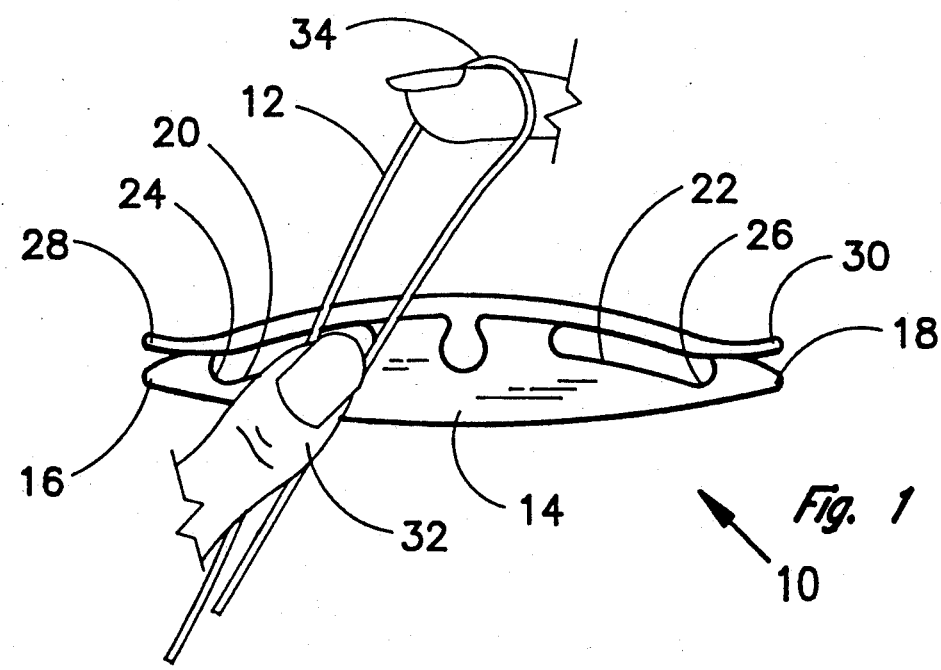
FIG. 1 is a perspective view of a fixed loop knot tying device to be used as a part of the line-to-lure rigging of the present invention.

Referring to the drawings in detail, FIG. 1 illustrates a perspective view of a fixed loop knot tying device 10 to be used as a part of a line-to-lure rigging system of the present invention.

It will be understood that the tying device 10 is one embodiment and that other embodiments are possible. The rigging system in each case will be utilized to secure a lure, jig or hook to a fishing line 12. One type of fishing line that is extremely popular is a monofilament line which is very thin and not always easily visible.

The fixed loop knot tying device 10 has an elongated body 14 with a pair of identical ends 16 and 18.

Near each end 16 and 18 is a recess 20 and 22, respectively. Each recess 20 and 22 includes a notch 24 and 26, respectively. The recesses are enclosed by jaws 28 and 30 extending from the body.

The jaws 28 and 30 may be formed as an integral part of the body or may be a separate piece as shown in the FIG. 1 embodiment. The jaws might be fabricated separate from the body and snap fit to the body. The jaws would be somewhat flexible and resilient to open from the normally closed position for passage of the line.

Figure 2:
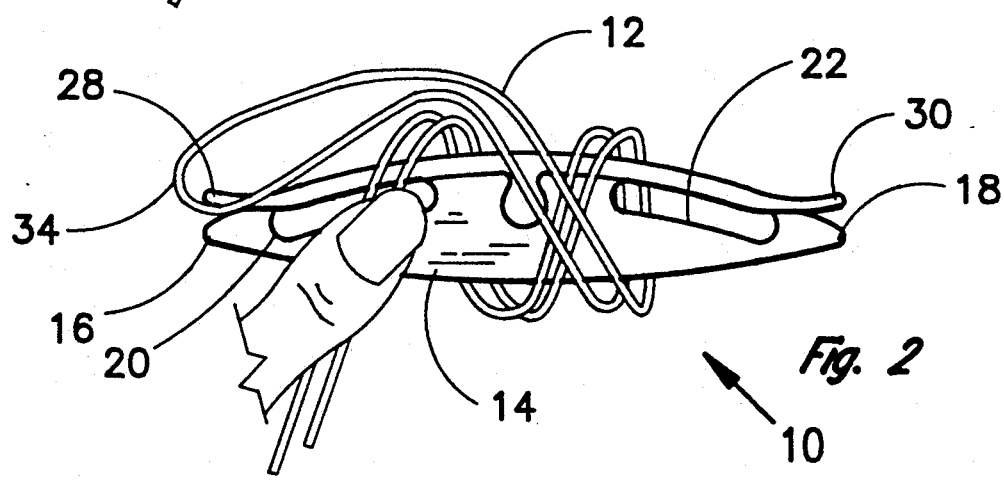
FIGS. 2 and 3 illustrate the sequential use of the knot tying device to produce a fixed loop knot in the line-to-lure rigging system.
Figure 3:
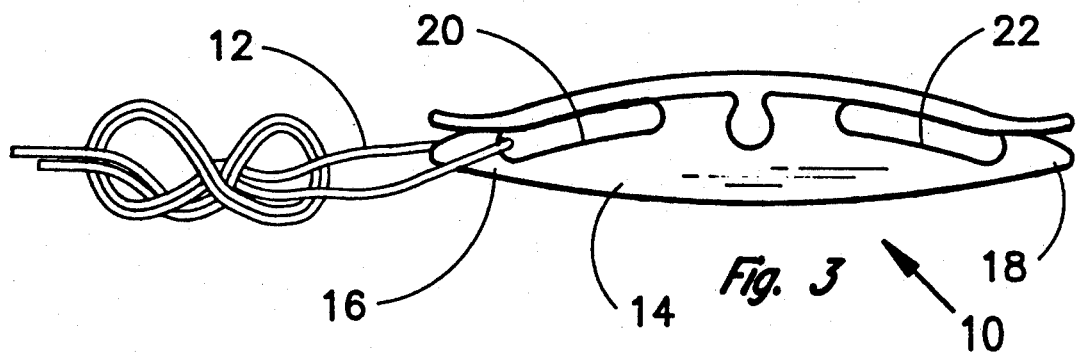

FIGS. 1, 2 and 3 illustrate, in sequence, use of the fixed loop knot tying device 10 to produce a fixed loop knot. Initially, a length of line 12 is doubled over so that it terminates in a loop as shown in FIG. 1. The knot tying device 10 may be held in the left hand between the left thumb 32 and the forefinger (not shown) with a length of line 12 under the thumb. An adequate length of folded line will be allowed to perform the following steps to be described. The loop end 34 will be held in the opposite or right hand. Alternatively, the forefinger of the opposite hand may be placed in the loop as shown in FIG. 1.

From the point where the folded line is held against the device 10 by the left thumb 32, the line is wrapped around the knot tying device 10 twice to form two circles, as seen in FIG. 2.

After the two circles have been wound around the body 10, the loop end 34 of the line will be brought across the circles and will be hooked into the recess 20 by moving past the jaw 28.

FIG. 3 illustrates the final step in producing the knotted loop. The knot tying device 10 will be pulled away from the circular wrappings so that the loop end 34 of the line passes through the two circles. The loop end 34 of the line is retained by the notch 24 in the recess 20 for tightening of the knot. It will be observed since the ends of the device are identical, either end may be used to produce the knot, making it impossible for the operator to hold it incorrectly.

It will be recognized that the same sequence may be performed if the hands are reversed, or if the device is held upside down.

Figure 4:
FIG. 4 illustrates a completed loop knot produced by the knot tying device shown in FIGS. 1, 2, and 3.

FIG. 4 illustrates the completed knotted loop. The knot may be contrasted with a surgeon's loop knot where a doubled line is placed in a single circle and the loop end is threaded through twice.

FIGS. 5, 6, 7 and 8 show an alternate knot tying device 40 which will produce an adjustable loop knot having a lure attached during the process. The adjustable loop knot tying device 40 will be used in place of the fixed loop knot tying device 10 previously described for the purpose of eliminating tangle of line with lure while tying.

The knot tying device 40 includes a sizing pin 42 which is pivotally attached at one end of the sizing pin to the device by a hinge bolt 44. A flexible shield or cover 46 forms a pocket in which the sizing pin may rest. The opposite end of the sizing pin extends past the flexible cover.

Figure 5:
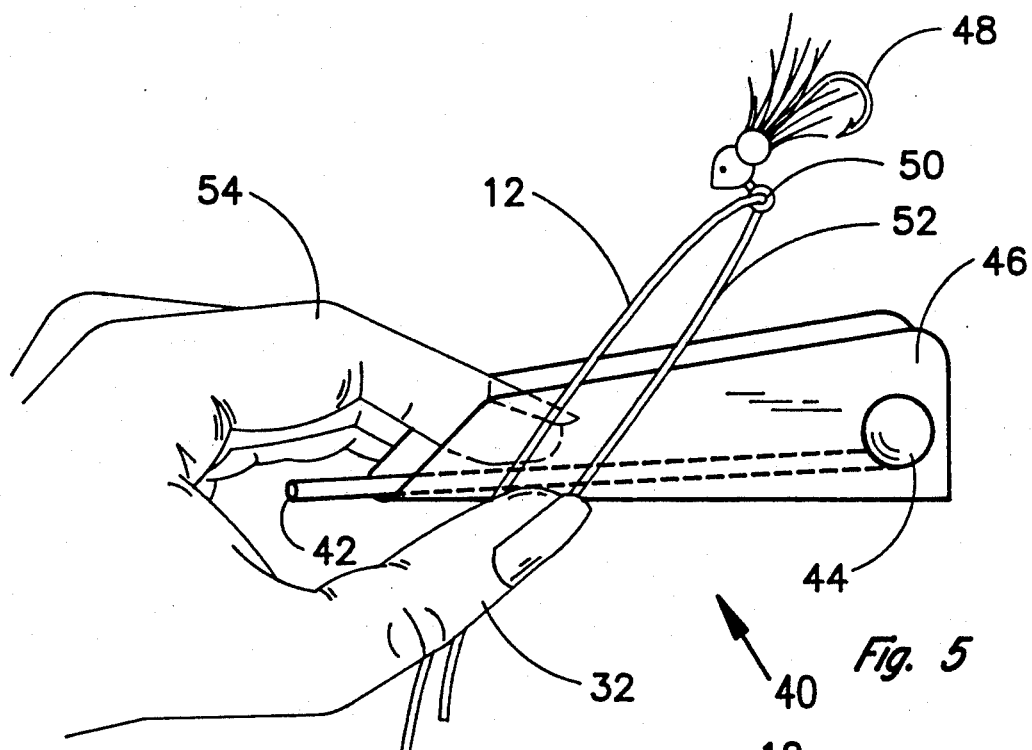
FIG. 5 is a perspective view of an alternate knot tying device which will produce the same knot with an adjustable loop having a lure attached.
Figure 6:
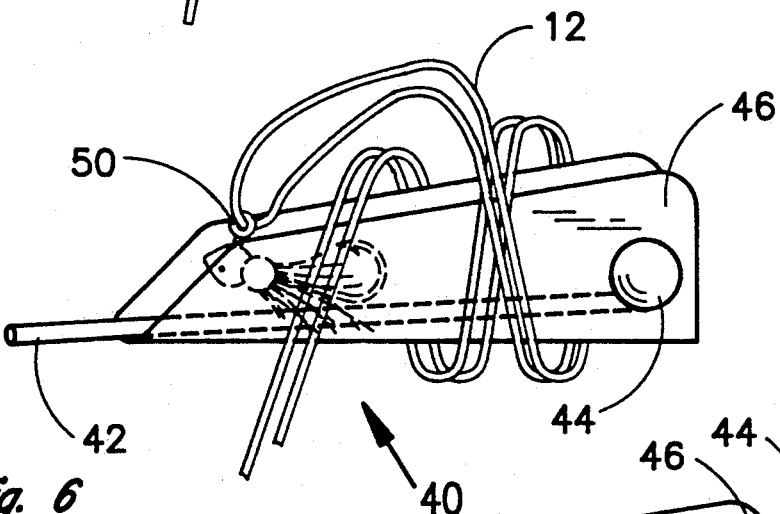
FIGS. 6, 7 and 8 illustrate the sequential of the knot tying device shown in FIG. 5 to produce a loop knot with an adjustable loop.

As seen in FIG. 5, the line 12 will be threaded onto a jig 48, lure or hook using an eyelet 50 or other connection provided. A length of line will be doubled over so that it terminates in a loop with the looped end 52 at the jig. The knot tying device 40 will be held in one hand with the line 12 retained between the thumb 32 and device 40. A finger 54 on the same hand will also be inserted in the pocket formed by the flexible cover 46. The looped end 52 of the line and the jig 48 are then wrapped around the knot tying device 40 twice in order to form two circles as best seen in FIG. 6.

Figure 7:
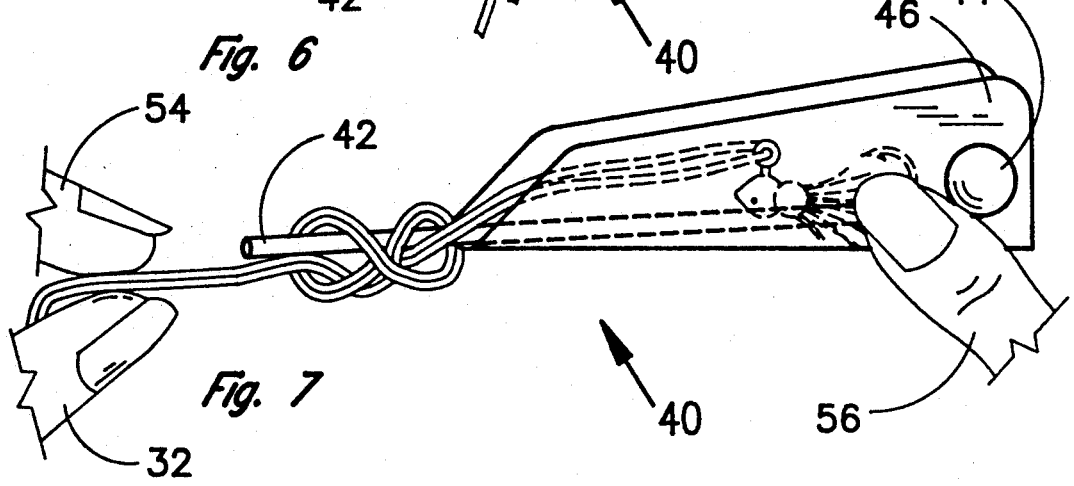

Once the two circles have been formed around the body of the knot tying device 40, the finger 54 is withdrawn from the pocket formed by the flexible cover 46. The jig and looped end 52 of the line are brought across the circular wrappings and inserted in the pocket. These will be tucked into the pocket deep enough so that the jig 48 is protected from entanglement and may be grasped or held in place by fingers 56 on the opposite hand through the flexible cover, as best seen in FIG. 7.

With the jig and looped end of the line retained by the opposite hand, the left hand will then hold the remaining line and slowly move the two circles off of the flexible cover 46 and onto the protruding sizing pin. At this point, a loose knot has been tied with the jig 48 at the loop end 52 of the line 12.

Figure 8:
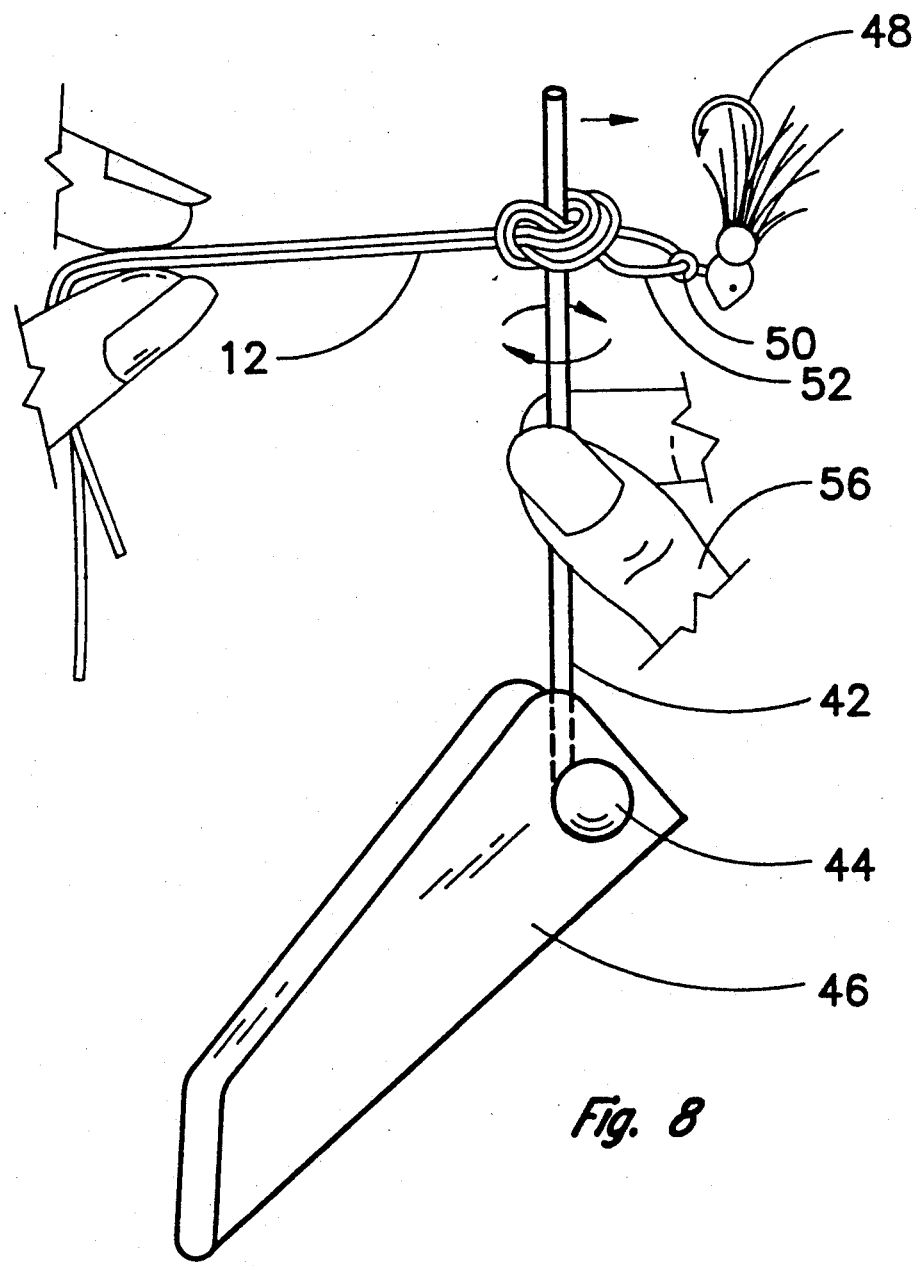

Best seen in FIG. 8, the sizing pin 42 may be pivoted about the axis formed by the hinge bolt 44 so that the sizing pin will be outside of the pocket formed by the flexible cover 46. The sizing pin may then be rotated between the thumb and forefinger of one hand while the opposite hand (thumb 3 and forefinger 54) is applying pressure in pulling the line 12. The knot will accordingly move toward the end 52 of the line 12. Accordingly, the size of the loop may be adjusted in this manner. Once the sizing pin has been removed and the knot tightened, the same non-slip, non-slide knot will result as discussed in relation to the fixed loop knot tying device 10 in FIGS. 1-4.

Figure 9:
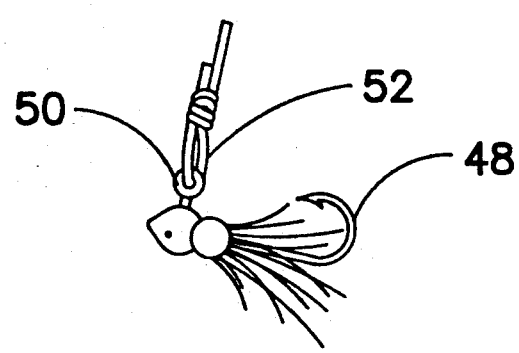
FIG. 9 shows the completed loop knot attached to a jig.

FIG. 9 shows the completed loop knot which has been tied to the eyelet 50 of the jig 48.

Once a knotted loop has been formed as shown in FIGS. 1-4, the loop as just described may be connected to a lure, jig or hook.

A quick change eyelet connection 60 is shown in FIGS. 10 and 11 in use with a hook 61. FIG. 10 shows a side view and FIG. 11 shows a top view of the quick change eyelet connection.

The eyelet connection 60 includes an eyelet 62 having a generally circular configuration. It will be understood that the eyelet need not be circular as long as it provides an enclosure with an opening therethrough. The eyelet 60 also includes an extending post 64 that crosses the diameter of the eyelet generally parallel to the plane of the eyelet. The post 64 extends past the circumference of the eyelet but is spaced therefrom. The terminal tip 66 of the post also is bent toward the eyelet leaving a space or passage between the post and the eyelet for passage of the loop.

This eyelet might be compared to a belt buckle with a rigid tongue which is permanently partially open.

In order to attach the knotted loop to the eyelet connection 60, the loop is inserted through the eyelet 62 from the side opposite to the post 64. The loop is then opened and threaded over the terminal tip 66 of the post. The line 12 is somewhat stiff or rigid even in water, and will not bend in excess on its own. Once the loop is over the post it will not be able to come off until it is forcibly pushed over the post.

The eyelet connection 60 may also be used on a jig 68 or lure, as seen in FIG. 12.

FIGS. 13 and 14 illustrates an adaptable quick change eyelet connection which would be fitted on an existing hook or lure eyelet by threading a finger 69 through the hook eyelet and crimping to the shank.

FIGS. 15, 16 and 17 illustrate an alternate attachable connection mechanism in the form of a split head connection that may be used to connect a knotted loop to a jig.

FIGS. 15, 16 and 17 show a sequence of assembly in order to assemble the split head connection 70. The shank 72 of a hook terminates in an eyelet 74 having an opening in the circumference which is adjacent to the shank 72.

FIG. 16 of the present embodiment shows an eyelet formed as an extension of the shank wherein a stretchable rubber grommet 76 is threaded through the secondary eyelet 77 and retains a pair of opposed heads 78 and 80.

The rubber grommet forcibly retains the heads against the eyelet. In order to connect the fishing line, loop end of the line will be slipped over the split head connection 70 against the shank 72 and pulled past the pair of jig heads as shown in FIG. 17, spreading them apart sufficiently for line passage. Stated another way, the rubber grommet has a certain stretch capability to allow the heads to move away from the eyelet under pressure. During fishing, the knotted loop will not be able to come back off of the split head connection because of the heads pressed against the eyelet 74. In order to remove the loop from the split head connection, the line is pulled back downward toward the shank. Once the force of the jig heads against the eyelet is overcome, the line will quickly snap off without having to cut or retie the line.

FIG. 18 shows the completed split head connection. Arrow 82 illustrates the direction the knotted loop is pulled to attach to the split head connection. Arrow 84 illustrates the direction the knotted loop is pulled to detach the loop from the split head connection.

FIGS. 19, 20 and 21 illustrate an alternate embodiment of the split head connection 90 showing a sequence of assembly in or to construct the split head connection 90. The shank 72 of the hook terminates in an eyelet 94 wherein a portion of the eyelet is not planar and forms a compression spring 99. A pair of heads 96 and 98 are retained against the eyelet by a length controlled rivet 100, which partially compresses the spring. In this case, the half head 96 maintains pressure against the shank 72 and that part of the eyelet 94 contiguous thereto by means of the half head 98 and the rivet 100 working in conjunction with compression spring 99 to regulate said pressure, leaving sufficient uncompressed spring to permit a fish line to crowd between the shank and the half head 96 when being attached to a loop of fish line.

Whereas, the present invention has been described in relation to the drawings attached hereto, it should be understood that other and further modifications, apart from those shown or suggested herein, may be made within the spirit and scope of this invention.

What is claimed is:

1. A rigging system to attach a fishing line to a lure or hook, which system comprises:
   a doubled length of said line terminating in a loop; said loop having a loop end,
   knot tying means having an elongated body and two identical ends, each end having a recess enclosed by a jaw extending from said body;
   whereby a knotted loop can be formed by wrapping said double length of line twice around said body forming two circular wrappings, passing said loop end across said wrappings, and then pulling said knot tying means away from said wrappings;
   lure connection means to connect said knotted loop to said lure or hook.

2. A rigging system as set forth in claim 1 wherein said knotted loop is detachably connected to said lure or hook.

3. A rigging system as set forth in claim 1 wherein said connection means includes an eyelet having an extending post that crosses the diameter of the eyelet substantially parallel to the plane of the eyelet and terminates in an end that extends past the circumference of said eyelet so that said knotted loop is detachably connected therewith.

4. A rigging system as set forth in claim 1 wherein said connection means includes an eyelet having an opening in its circumference to receive said knotted loop and a head on each side of said eyelet.

5. A rigging system to attach a fishing line to a lure or hook, which comprises:

lure connection means to connect said lure or hook to a loop of said fishing line;

a doubled length of said line terminating in said loop;

knot tying means to receive said lure or hook and said loop wrapped twice around a body of said knot tying means to form two circular wrappings, to retain said lure and said loop within said knot tying means, and to pull said two circular wrappings over said lure and said loop to form a knotted loop, wherein said knot tying means includes a sizing pin pivotally attached to said body at one end thereof, and a flexible cover forming a protective pocket to retain said lure or hook and said loop to form a knotted loop.

6. A rigging system as set forth in claim 5 wherein said lure is connected to said knotted loop by said connection means and wherein said lure is retained within said protective pocket of flexible cover along with said knotted loop during use of said knot tying means to form said knotted loop.

7. A rigging system as set forth in claim 5 wherein the size of said loop is adjustable by use of said sizing pin.

8. A rigging system to attach a fishing line to a hook, which system comprises:

a double length of said line terminating in a loop;

a knot tying means to receive said doubled length of said line terminating in a loop wrapped twice around a body of said knot tying means to form two circular wrappings, to retain said loop in said knot tying means, and to pull said two circular wrappings over said retained loop to form a knotted loop;

connection means including an eyelet having an extending post that crosses the diameter of the eyelet substantially parallel to the plane of the eyelet and terminates in an end that extends past the circumference of said eyelet so that said knotted loop is detachably connected therewith; and hook connection means to connect said eyelet to said hook.

* * * * *